Feb. 13, 1962  D. J. GREENING ET AL  3,021,466
MOTOR CONTROL SYSTEMS
Filed April 6, 1959

Inventors
Donald J. Greening
Charles E. Smith
By H R Rather
Attorney

United States Patent Office 3,021,466
Patented Feb. 13, 1962

3,021,466
MOTOR CONTROL SYSTEMS
Donald J. Greening, Thiensville, and Charles E. Smith, Milwaukee, Wis., assignors to Cutler-Hammer, Inc., Milwaukee, Wis., a corporation of Delaware
Filed Apr. 6, 1959, Ser. No. 804,301
9 Claims. (Cl. 318—327)

This invention relates to motor control systems and more particularly to adjustable voltage systems for direct current motors.

While not limited thereto, the invention is especially applicable to direct current motor control with current limit acceleration and deceleration and for automatic regulation of the voltage or speed of the motor.

A general object of the invention is to provide motor control systems of the modular type.

A more specific object of the invention is to provide a plurality of component circuits or modules each having input and output terminals and being readily connectable to one another and to external elements to afford improved motor control systems.

Another specific object of the invention is to provide a plurality of component circuits or modules of the semiconductor controlled type, each adapted to be embedded in plastic material and having external terminals for connection in a motor control system.

Another object of the invention is to provide improved motor control systems employing semi-conductor devices.

A further object of the invention is to provide an improved adjustable voltage motor control system of the semiconductor controlled type having current limit acceleration and deceleration and automatic regulation of the voltage or speed of the motor.

Other objects and advantages of the invention will hereinafter appear.

While the apparatus hereinafter described is effectively adapted to fulfill the objects stated, it is to be understood that we do not intend to confine our invention to the particular preferred embodiments of motor control systems disclosed inasmuch as they are susceptible of various modifications without departing from the scope of the appended claims.

Figure 1:
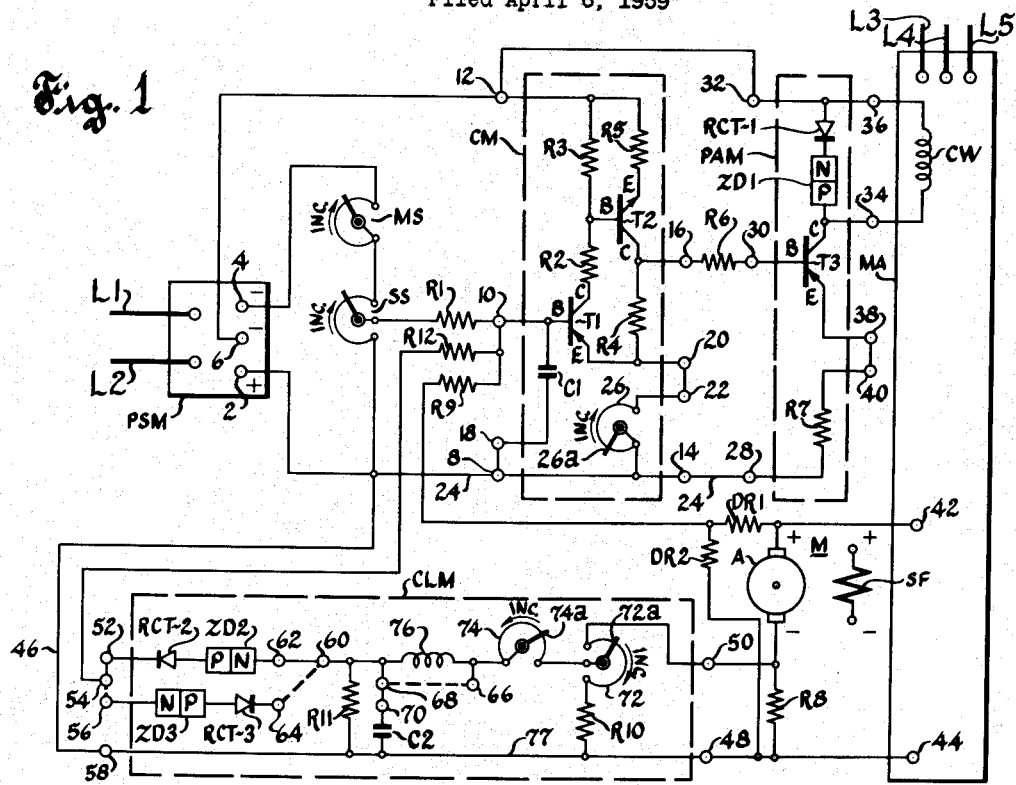
Figure 3:
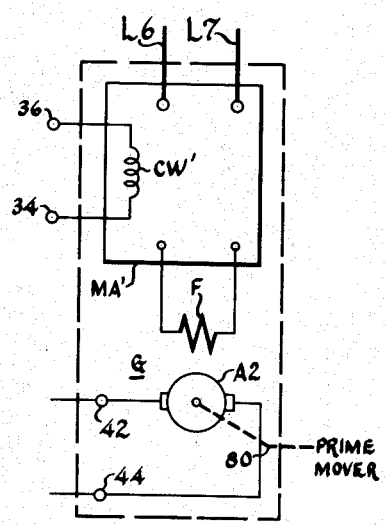
Figure 2:
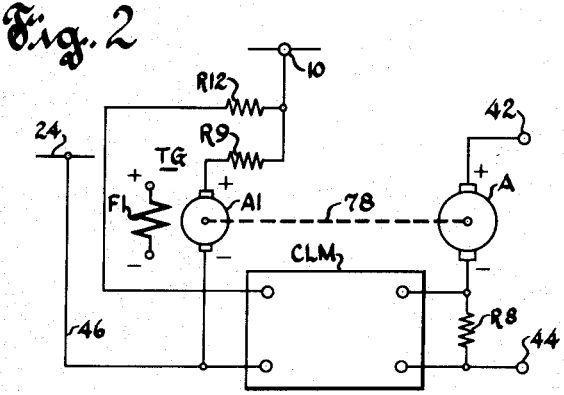

The invention will now be described in detail with reference to the accompanying drawings, wherein:

FIGURE 1 diagrammatically depicts a motor control system constructed in accordance with the invention;

FIG. 2 is a fragmentary diagram of a speed regulator circuit which may be substituted in place of the voltage regulator circuit in the lower portion of FIG. 1 to modify the latter; and FIG. 3 shows another modification which may be substituted for the magnetic amplifier in the right-hand portion of FIG. 1 to afford an adjustable voltage generator for motor control.

Referring to FIG. 1, there is shown a modular control system for a motor M having an armature A and a shunt field winding SF. Field winding SF may be supplied from a suitable constant direct current source as indicated by the positive and negative symbols. Armature A is supplied with adjustable unidirectional voltage from a magnetic amplifier MA as hereinbefore described to control the speed of the motor.

The control system for magnetic amplifier MA comprises a power supply module PSM, a comparator module CM, a power amplifier module PAM, a voltage regulator feedback circuit and a current limit module CLM. Power supply module PSM is connected through power supply lines L1 and L2 to a single-phase alternating current power supply source and is provided with a positive output terminal 2 and a pair of negative output terminals 4 and 6 for supplying two predetermined different values of a direct current output. Power supply module PSM is of a well-known rectifier bridge type and the details thereof have not been shown to avoid complicating the drawings. The rectified output from terminals 2 and 4 is preferably regulated and the rectified output from terminals 2 and 6 may be unregulated.

A speed setter potentiometer SS and a maximum speed rheostat MS are connected in series across terminals 2 and 4, the movable arm of rheostat MS being connected to the junction thereof with potentiometer SS. Comparator module CM is provided with external input terminals 8, 10 and 12, external output terminals 14 and 16 and external terminals 18, 20 and 22 for reasons hereinafter described. The movable arm of speed setter potentiometer SS is connected through resistor R1 to input terminal 10 of comparator circuit CM. Positive output terminal 2 of power supply circuit PSM is connected through a common conductor 24 directly to input terminal 8 of comparator circuit CM and input terminal 12 of the latter is connected directly to negative terminal 6 of power supply circuit PSM.

Comparator module CM is provided with a semi-conductor device such as a transistor T1 of the P-N-P conductivity type having an emitter electrode E, a base electrode B and a collector electrode C. Input terminal 10 is connected directly to base electrode B. Input terminal 8 is connected through common conductor 24 and movable arm 26a and the upper portion of the resistor of a gain adjusting rheostat 26 to emitter electrode E. A filter capacitor C1 is connected between base electrode B and common conductor 24 through external terminal 18 to filter the input voltage. Terminal 18 is provided between capacitor C1 and input terminal 8 to afford disconnection of capacitor C1 by removing the jumper between terminals 8 and 18. Additional filter capacitance may be added by connecting a capacitor of desired value between terminals 10 and 18. Collector electrode C of transistor T1 is connected through resistors R2 and R3 to input terminal 12.

Comparator circuit CM is provided with a second semiconductor device such as a transistor T2 of the opposite or N-P-N conductivity type having an emitter electrode E, a base electrode B and a collector electrode C. The junction of resistors R2 and R3 is connected directly to base electrode B of transistor T2. The junction of emitter electrode E of transistor T1 and rheostat 26 is connected through a resistor R4 to collector electrode C of transistor T2 and emitter electrode E of the latter is connected through a resistor R5 to input terminal 12. The output from comparator circuit CM is obtained from common conductor 24 at output terminal 14 and output terminal 16 connected to the junction of resistor R4 and collector electrode C of transistor T2. External terminals 20 and 22 which are connected in series between rheostat 26 and the junction of emitter electrode E of transistor T1 and resistor R4 are provided to afford adjustment of the gain and stability of the comparator circuit. Thus, comparator gain may be decreased and stability increased by disconnecting the jumper between terminals 20 and 22 and adding the desired value of resistance between these terminals. Comparator gain may be increased and stability decreased by turning arm 26a of rheostat 26 clockwise in the direction of the arrow.

Power amplifier module PAM is provided with external input terminals 28, 30 and 32, external output terminals 34 and 36 and external terminals 38 and 40 for reasons hereinafter described. Output terminal 14 of comparator circuit CM is connected through common conductor 24 directly to input terminal 28. Output terminal 16 of comparator circuit CM is connected through a resistor R6 to input terminal 30 of power amplifier circuit PAM and input terminal 32 is directly supplied from negative direct current output terminal 6 of power supply circuit PSM.

Power amplifier circuit PAM is provided with a semi-conductor device such as a transistor T3 of the P-N-P conductivity type or the like having an emitter electrode E, a base electrode B and a collector electrode C. Input terminal 30 is connected directly to base electrode B, input terminal 28 is connected through a resistor R7 and serially jumpered terminals 40 and 38 to emitter electrode E of transistor T3 and collector electrode C is connected directly to output terminal 34. Input terminal 32 is connected directly to output terminal 36. A semi-conductor device such as a Zener diode ZD1 of the P-N conductivity type or the like and a blocking, protective half-wave rectifier RCT-1 are connected in series across output terminals 34 and 36. The output from power amplifier circuit PAM is obtained across output terminals 34 and 36 and applied across control winding CW of magnetic amplifier MA. External terminals 38 and 40 are provided to afford adjustment of the maximum output current of the power amplifier. To this end, the jumper between terminals 38 and 40 may be disconnected and the desired value of resistance connected in place thereof.

Magnetic amplifier MA is of a well-known construction and the details thereof have not been shown to avoid complicating the drawings. Magnetic amplifier MA is preferably supplied from a three-phase alternating current power supply source through power supply lines L3, L4 and L5. The rectified output of magnetic amplifier MA is applied from output terminals 42 and 44 across armature A of the motor in series with a current limit signal resistor R8. A voltage-regulating signal voltage is obtained from armature A and fed back to the input of comparator circuit CM. To this end, a voltage divider comprising serially-connected resistors DR1 and DR2 is connected across armature A. The junction of resistors DR1 and DR2 is connected through a resistor R9 to input terminal 10 of comparator circuit CM. The return path for this signal extends from common conductor 24 at input terminal 8 to the junction of resistor DR2 and the negative side of armature A.

Current limit circuit CLM is provided with external input terminals 48 and 50, external output terminals 52, 54, 56 and 58 and external terminals 60, 62, 64, 66, 68 and 70 for reasons hereinafter described. The junction of resistor R8 and the negative side of armature A is connected directly to input terminal 50 and the other end of resistor R8 is connected to input terminal 48. A current limit adjusting potentiometer 72 and a resistor R10 are connected in series across input terminals 50 and 48. Movable arm 72a of potentiometer 72 is connected through a "Taper" rheostat 74, a filter choke coil 76, a semi-conductor device such as a Zener diode ZD2 of the P-N conductivity type or the like and a half-wave rectifier RCT-2 to output terminal 52. Input terminal 48 is connected directly through conductor 77 to output terminal 58 and then through conductor 46 to common conductor 24. A filter capacitor C2 is connected from the junction of choke coil 76 and diode ZD2 to conductor 77. A resistor R11 is connected across capacitor C2.

As hereinafter more fully described, output terminal 52 is an accelerating current limit output terminal and output terminal 56 is a decelerating current limit output terminal. Terminal 54 is connected through a resistor R12 to input terminal 10 of comparator circuit CM and may be connected either to terminal 52 as shown by the solid line or to terminal 56 as shown by the broken line. Terminal 56 is connected through a semi-conductor device such as a Zener diode ZD3 of the P-N conductivity type or the like and a half-wave rectifier RCT-3 to external terminal 64. External terminals 62 and 60 are connected in series between diode ZD2 and the junction of resistor R11 and filter choke coil 76. Alternatively, terminal 60 may be connected to terminal 64 as shown by the broken line to provide deceleration current limit.

External terminals 66 and 68 are connected to respective ends of choke coil 76 and external terminal 70 is connected between terminal 68 and capacitor C2. When the motor armature current contains large alternating current components such as, for example, those produced by static generators, the filter comprising coil 76 and capacitor C2 is connected in the circuit as shown. When the motor armature current is free of such alternating current components, the filter may be removed by disconnecting the jumper between terminals 68 and 70 to disconnect one side of capacitor C2 and connecting a jumper between terminals 66 and 68 thereby to shunt coil 76 effectively out of circuit.

FIG. 2 shows a speed regulator circuit which may be substituted for the voltage regulator connections of FIG. 1. As shown in FIG. 2, rotary armature A of motor M is connected through a shaft 78 to drive armature A1 of a tachometer generator TG. Field winding F1 of tachometer generator TG may be energized from a suitable source of constant direct current as shown by the positive and negative symbols. To employ this speed regulator circuit in the system of FIG. 1, the voltage regulator connection extending from the junction of resistors DR1 and DR2 to resistor R9 and resistors DR1 and DR2 are disconnected and the positive side of armature A1 of tachometer generator TG is connected to resistor R9 as shown in FIG. 2. The negative side of armature A1 is connected to conductor 46 and therethrough to common conductor 24. With these connections, a voltage which is a function of the speed of motor M is compared with the reference voltage and with the current limit voltage in comparator circuit CM to regulate the speed of motor M as hereinafter more fully described.

FIG. 3 shows an alternative adjustable-voltage motor armature voltage source which may be substituted in place of magnetic amplifier MA to modify the system of FIG. 1. As shown in FIG. 3, a magnetic amplifier MA' of known type is supplied through lines L6 and L7 from a single-phase alternating current power supply source. Magnetic amplifier MA' is provided with a control winding CW' which is energized from output terminals 34 and 36 of power amplifier circuit PAM in FIG. 1. The rectified output of magnetic amplifier MA' is connected across field winding F of a direct current generator G. Armature A2 of generator G is mechanically driven through shaft 80 by a prime mover such as an alternating current motor or the like. Armature A2 of the generator is connected to terminals 42 and 44 and therethrough across armature A of the motor. With these connections, the generator supplies the motor armature voltage and the value thereof may be adjustably controlled by varying the generator field excitation in accordance with the reference voltage.

The operation of the system of FIG. 1 will now be described. Let it be assumed that single phase alternating current power is connected through lines L1 and L2 to power supply circuit PSM and that three phase alternating current powder is connected through lines L3, L4 and L5 to magnetic amplifier MA. Magnetic amplifier MA will be biased to its off condition so that an output voltage will not be applied to motor armature A until control winding CW is energized as hereinafter described Let it further be assumed that shunt field winding SF is energized from a source of unidirectional voltage.

Connection of power to circuit PSM causes a unidirectional current flow from positive output terminal 2 thereof through the resistor of speed setter potentiometer SS and the movable arm and the upper portion of the resistor of maximum speed rheostat MS to negative output terminal 4. An adjustable portion of the voltage drop across the resistor of potentiometer SS which constitutes the motor speed reference voltage is applied through common conductor 24 to input terminal 8 and through the movable arm of potentiometer SS and resistor R1 to input terminal 10 of comparator circuit CM. Capacitor C1 acts to filter this rectified voltage. As a result, a positive voltage bias is applied across the emitter and base electrodes of transistor T1 in a circuit extending from input terminal 8 through movable arm 26a and the upper portion of the resistor of gain adjusting rheostat 26, serially jumpered terminals 22 and 20 and emitter electrode E and base electrode B of transistor T1 to input terminal 10 to render transistor T1 conducting. The conducting path of transistor T1 may be traced from terminal 8 through rheostat 26, terminals 22 and 20, emitter E and collector C of transistor T1, resistors R2 and R3 and input terminal 12 to negative terminal 6 of power supply circuit PSM.

The voltage drop across resistor R3 affords a negative voltage bias across the emitter and base electrodes of transistor T2 to render the latter conducting. Thus, current flows from input terminal 2 through rheostat 26, terminals 22 and 20, resistor R4, collector C and emitter E of transistor T2, resistor R5 and terminal 12 to negative terminal 6 of power supply circuit PSM. The amplified output voltage from comparator circuit CM, which is a function of the reference voltage and the collector circuit resistance of transistor T2, is obtained from output terminals 14 and 16 and applied through resistor R6 to input terminals 28 and 30 of power amplifier circuit PAM.

Comparator circuit CM is provided with transistors of opposite conductivity types connected as hereinbefore described to afford temperature compensation and to enable input terminal 8 and output terminal 14 to be connected to common conductor 24. Thus, the same voltage level is maintained through common conductor 24 throughout the control system. In the event the collector current of transistor T2 increases from a selected value due to ambient temperature change, the voltage drop across rheostat 26 correspondingly increases. As a result, the positive emitter bias voltage of transistor T1 becomes less positive to decrease the current flow through the latter. Such decreased current flow correspondingly decreases the voltage drop across resistor R3 which provides the negative emitter bias voltage for transistor T2. Consequently, the emitter bias of transistor T2 is accordingly decreased to reduce the collector current of the latter. Thus, the output of the comparator circuit is automatically maintained at the preselected value. Likewise, if the collector current of transistor T1 increases due to ambient temperature change, the voltage drop across resistor R3 also increases to bias the emitter electrode of transistor T2 more negative and to increase the current flow through the latter. This current flow increases the voltage drop across the resistor of rheostat 26 as aforestated thereby to decrease the positive emitter bias of transistor T1 and conduction through the latter. Thus, the comparator circuit automatically compensates for undesirable temperature effects to maintain the output voltage constant in accordance with the setting of potentiometer SS.

The voltage gain of comparator circuit CM may be increased by turning movable arm 26a of rheostat 26 clockwise in the direction of the arrow and decreased by turning arm 26a in the opposite direction.

A positive emitter bias voltage is applied from input terminals 28 and 30 of power amplifier circuit PAM through resistor R7 and terminals 40 and 38 across the emitter and base electrodes of transistor T3 to render the latter conducting. As a result, current flows from input terminal 28 through resistor R7, terminals 40 and 38, emitter E and collector C of transistor T3, output terminal 34, control winding CW of magnetic amplifier MA, output terminal 36 and input terminal 32 to negative direct current terminal 6 of power supply circuit PSM. Control winding CW causes the magnetic amplifier to be biased to its on condition whereby rectified voltage is applied from output terminals 42 and 44 thereof across armature A and resistor R8 to effect operation of the motor and acceleration thereof to a speed determined by the setting of potentiometer SS.

Acceleration current limit is provided by current limit module CLM. To this end, a voltage proportional to the motor armature curent is applied from the opposite ends of resistor R8 to input terminals 50 and 48 of circuit CLM and therethrough across the resistor of current limit adjusting potentiometer 72 and resistor R10 in series. An adjustable portion of this voltage is applied from movable arm 72a of potentiometer 72 through the right-hand portion of the resistor of "Taper" rheostat 74 and movable arm 74a and choke coil 76 across resistor R11. If the motor armature current during acceleration exceeds a predetermined safe value, the voltage across resistor R11 reaches the Zener voltage or, in other words, the value of voltage required to initiate a current avalanche through diode ZD2 and rectifier RCT-2 to output terminal 52. As a result, a current limit voltage of opposite polarity to the reference voltage derived from the movable arm of potentiometer SS is applied from output terminal 54 through resistor R12 to input terminal 10 of comparator circuit CM. This causes a corresponding decrease in the reference voltage resulting in a decrease in armature voltage thereby to decrease the motor armature current to the safe value.

A feedback voltage proportional to the motor armature voltage is applied from the junction of resistors DR1 and DR2 through resistor R9 to input terminal 10 of comparator circuit CM. It will be apparent that this feedback voltage has opposite polarity relative to the reference voltage applied from the movable arm of potentiometer SS to input terminal 10. Thus, a voltage proportional to any variation in the armature voltage is fed back and compared with the speed reference voltage and the current limit voltage, if present, and the resultant voltage is applied through comparator circuit CM and power amplifier circuit PAM to control magnetic amplifier MA. This effects regulation of the armature voltage to a predetermined value and limiting of the armature current to a safe value.

The magnitude of the output voltage applied to armature A of motor M may be increased by turning speed setter potentiometer SS clockwise in the direction of the arrow and decreased by turning the same in the opposite direction. This causes corresponding increase or decrease in the motor speed. The maximum voltage obtainable by adjustment of speed setter potentiometer SS is determined and adjusted by setting the movable arm of maximum speed rheostat MS. Turning the movable arm of the latter all the way clockwise in the direction of the arrow shunts the resistance of rheostat MS effectively out of circuit so that the maximum speed reference voltage applicable to the comparator circuit is substantially equal to the voltage derived from output terminals 2 and 4 of power supply circuit PSM.

To stop the motor, speed setter potentiometer SS may be turned all the way counter-clockwise to decrease the reference voltage to zero or power may be disconnected from the control system. As a result, the applied armature voltage is decreased to zero value to stop the motor.

Transistor T3 of power amplifier circuit PAM is protected from the inductive effect of control winding CW. It will be apparent that when the motor is accelerated or running, the output current of the power amplifier flows through control winding CW and that rectifier RCT-1 blocks current flow through the shunt circuit. However, when the motor is decelerated or stopped, the shunt circuit prevents current flow of large magnitude through transistor T3 which might damage or destroy the latter. Thus, current caused to flow by the inductive counter-voltage of winding CW in response to collapse of its magnetic field flows through terminal 36, rectifier RCT–1, diode ZD1 and terminal 34. Diode ZD1 is of the Zener type and responds to a voltage of predetermined value to effect an avalanche of current flow therethrough to protect transistor T3.

Alternatively, deceleration current limit may be provided by disconnecting the jumper between terminals 52 and 54 and connecting a jumper between terminals 54 and 56 and disconnecting the jumper between terminals 60 and 62 and connecting a jumper between terminals 60 and 64. Now, when the movable arm of potentiometer SS is turned rapidly counterclockwise to decelerate the motor, the applied armature voltage is correspondingly decreased. As a result, the rotating armature generates a counter voltage which exceeds the applied voltage and of opposite polarity to the latter. When the reverse current caused to flow by such generated voltage exceeds a predetermined safe value, deceleration current limiting action is initiated. If deceleration current limit is desired, it will be necessary to connect an armature shunt resistor in known manner because rectifying magnetic amplifier MA will not conduct reverse current. The voltage drop across resistor R8 which is proportional to the armature current will be of opposite polarity so that a positive voltage will be applied through input terminal 48, conductor 77, output terminal 58 and conductor 46 to common conductor 24 and a negative voltage will be applied through input terminal 50, potentiometer 72, rheostat 74, coil 76, terminals 60 and 64, rectifier RCT–3, diode ZD3, output terminals 56 and 54 and resistor R12 to input terminal 10 of comparator circuit CM. This negative current limit signal voltage applied to input terminal 10 is added to the negative reference voltage and the resultant voltage is amplified and applied to control winding CW. Thus, the current limit voltage prevents rapid decrease in the applied armature voltage and maintains the decelerating armature current at a safe value.

The armature voltage at which current limiting is initiated may be increased by turning movable arm 72a of potentiometer 72 clockwise in the arrow direction and decreased by turning the arm in the opposite direction. Rheostat 74 is provided to enable adjustment in the "Taper" in current limiting action, taper being defined as the difference between the maximum value to which the armature current increases at a given time and the lower armature current value at which current limiting is initiated. Turning movable arm 74a counter-clockwise in the direction of the arrow increases the difference between the aforementioned current values and turning the movable arm in the opposite direction decreases such difference.

While current limit circuit CLM has been illustrated as having accelerating current limit elements ZD2 and RCT–2 and decelerating current limit elements ZD3 and RCT–3 alternatively connectable therein by way of external terminals, it will be apparent that two current limit circuits could be connected in parallel, one having elements ZD2 and RCT–2 and the other having elements ZD3 and RCT–3 to provide both accelerating current limit and decelerating current limit if desired.

Referring to FIG. 2, it will be apparent that when tachometer generator TG is substituted for resistors DR1 and DR2 and the armature voltage feedback connection in FIG. 1 and the motor armature is connected by shaft 78 to drive the tachometer generator, the system is modified to afford automatic regulation of the motor speed. With these connections, tachometer generator TG provides an output voltage which is proportional to motor speed. This voltage is fed back through resistor R9 to input terminal 10 of comparator circuit CM and compared in the latter with the reference voltage derived from the movable arm of potentiometer SS. The resultant voltage is applied from comparator circuit CM through power amplifier PAM to control winding CW of magnetic amplifier MA which in turn controls the motor armature voltage. Thus, any undesired variation in motor speed is immediately reflected in the magnetic amplifier and the latter readjusts the voltage applied across armature A to maintain the motor speed constant.

When the apparatus shown in FIG. 3 is substituted for magnetic amplifier MA of FIG. 1, the power amplifier output voltage is applied from output terminals 34 and 36 across control winding CW' of magnetic amplifier MA'. The rectified output from magnetic amplifier MA' is employed to provide adjustable excitation of field winding F of generator G. Armature A2 of generator G is driven by a prime mover through shaft 80 and the generator armature output voltage is applied through terminals 42 and 44 across armature A of motor M and resistor R8. This modified system operates substantially as hereinbefore described and the generator output voltage may be adjusted by varying its field excitation. Either voltage regulation as shown in the lower portion of FIG. 1 or speed regulation as shown in FIG. 2 may be employed with the system when modified in accordance with FIG. 3. For deceleration current limit with this modification, the aforementioned armature shunt resistor is not required as the generator will receive reverse current from the motor.

It will be apparent that the systems hereinbefore described are extremely simple in construction and efficient in operation. The system is constructed of modular component circuits with a minimum of external control elements which may readily be connected to the external terminals provided. Only those elements which may be varied in value depending upon the power supplies used are connected externally of the modules in the control system. The novel modular circuits devised are adapted for potting in plastic material because only long lasting elements are employed therein which do not require replacement over long periods of operational use. The motor speed may be adjusted as desired and the system affords adjustable current limit for acceleration or deceleration to protect the armature winding. The system is arranged for either voltage or speed regulation. The comparator circuit has been constructed so that it will automatically correct any variation in conduction through the transistors due to temperature changes and the power amplifier circuit protects its transistor from the inductive load.

We claim:

1. In an adjustable voltage system comprising a direct current motor having a shunt field winding energized from a source of unidirectional voltage, an armature winding and an alternating current source, in combination, power translating means comprising a magnetic amplifier energized from the alternating current source for controlling supply of unidirectional voltage to the armature winding to effect operation of the motor, said magnetic amplifier having a control winding energizable to control the output thereof, means for controlling energization of said control winding comprising a modular rectifying power supply network, a modular comparator network, a modular power amplifier network and a modular current limit network, each of said networks having input terminals and output terminals, the input terminals of said power supply network being connected to said alternating current source, a selectively adjustable speed setter connected between the output terminals of said power supply network and the input terminals of said comparator network for adjusting the rectified input reference voltage to the latter, means for deriving a voltage proportional to armature current and applying the same to the input terminals of said current limit network, said current limit network comprising semi-conductor means responsive to a predetermined value of voltage applied thereto and adjustable means for preselecting the value of armature current at which said semi-conductor means responds, means for connecting the output terminals of said current limit network to the input terminals of said comparator network, said comparator network comprising semi-conductor means for providing a resultant control voltage in response to the voltages applied to its input terminals, means for connecting the output terminals of said comparator network to the input terminals of said power amplifier network, and means for connecting the output terminals of said power amplifier network to said control winding whereby said magnetic amplifier controls the armature voltage.

2. The invention defined in claim 1, wherein said power translating means additionally comprises a direct current generator having a field winding subjected to controlled energization by the output voltage of said magnetic amplifier and a driven armature winding for applying unidirectional voltage to the armature winding of the motor.

3. The invention defined in claim 1, together with means for providing a feedback signal voltage proportional to the motor armature voltage and applying the same to the input terminals of said comparator network for regulating the motor armature voltage.

4. The invention defined in claim 1, together with means for providing a feedback signal voltage proportional to the motor speed and applying the same to the input terminals of said comparator network for regulating the motor speed.

5. The invention defined in claim 1, wherein said power amplifier network comprises a semi-conductor device for supplying amplified voltage to said control winding, and a protective circuit comprising unidirectional conducting means connected across said control winding for protecting said semi-conductor device from the inductive effort of said control winding.

6. In an adjustable voltage system for a direct current motor wherein the motor is provided with a shunt field winding energized from a source of unidirectional voltage, an armature winding, an alternating current source, and a controllable voltage control device connected to said source for supplying adjustable unidirectional voltage to said armature winding to control the speed of the motor, the improvement comprising modular means for controlling said device selectively to adjust and regulate the motor speed, said modular means comprising a modular rectifying power supply network, a modular comparator network, a modular power amplifier, and a modular current limit network, each of said networks comprising semi-conductor control elements which adapts them to be potted in plastic material, each of said networks further having input terminals and output terminals externally thereof, the input terminals of said power supply network being connected to said power supply source, a selectively adjustable speed setter connected between the output terminals of said power supply network and the input terminals of said comparator network for adjusting the rectified input reference voltage to the latter, means connecting the input terminals of said current limit network to the armature circuit to derive a voltage proportional to the armature current, means connecting the output terminals of said current limit network to the input terminals of said comparator network, said comparator network comprising semi-conductor control means for providing a resultant control voltage in response to the voltages applied to its input terminals, means connecting the output terminals of said comparator network to the input terminals of said power amplifier network for amplifying said resultant control voltage, and means connecting the output terminals of said power amplifier network to said voltage control device to control the latter to adjust and regulate the armature voltage.

7. In an adjustable voltage system comprising a direct current motor having a shunt field winding energized from a source of unidirectional voltage, an armature winding, an alternating current source and power translating means energized from said alternating current source for applying voltage to the armature winding to effect operation of the motor, the improvement comprising means for controlling said power translating means to adjust and regulate the applied armature voltage including a source of unidirectional voltage, a speed setter for deriving a selectively adjustable reference voltage from said unidirectional source, a comparator network comprising amplifying semi-conductor devices responsive to said reference voltage and means for adjusting the gain of said network, a power amplifier responsive to operation of said comparator network for controlling said power translating means, and a current limit network comprising semi-conductor means responsive to the motor armature current for applying a current limit signal voltage to said comparator network for comparison with said reference voltage and including adjustable means for rendering said current limit network operative at a selected value of armature current, the resultant voltage from said comparator network being applied through said power amplifier to control said power translating means, said current limit network comprising first semi-conductor means effective for providing a current limit signal voltage when said speed setter is operated to accelerate the motor, second semi-conductor means effective for providing a current limit signal voltage when said speed setter is operated to decelerate the motor, and means for selectively rendering said first and second semi-conductor means effective.

8. In an adjustable voltage system comprising a direct current motor having a shunt field winding energized from a source of unidirectional voltage, an armature winding, an alternating current source and power translating means energized from said alternating current source for applying voltage to the armature winding to effect operation of the motor, the improvement comprising means for controlling said power translating means to adjust and regulate the applied armature voltage including a source of unidirectional voltage, a speed setter for deriving a selectively adjustable reference voltage from said unidirectional source, a comparator network comprising amplifying semi-conductor devices responsive to said reference voltage and means for adjusting the gain of said network, said amplifying semi-conductor devices comprising a pair of controllable semi-conductor devices of opposite conductivity types connected in serial relation, and means comprising said gain adjusting means for providing feedback voltage to compensate for variation in current conduction through said devices due to ambient temperature changes, a power amplifier responsive to operation of said comparator network for controlling said power translating means, and a current limit network comprising semi-conductor means responsive to the motor armature current for applying a current limit signal voltage to said comparator network for comparison with said reference voltage and including adjustable means for rendering said current limit network operative at a selected value of armature current, the resultant voltage from said comparator network being applied through said power amplifier to control said power translating means.

9. In an adjustable voltage system comprising a direct current motor having a shunt field winding energized from a source of unidirectional voltage, an armature winding, an alternating current source and power translating means energized from said alternating current source for applying voltage to the armature winding to effect operation of the motor, the improvement comprising means for controlling said power translating means to adjust and regulate the applied armature voltage including a source of unidirectional voltage, a speed setter for deriving a selectively adjustable reference voltage from said unidirectional source, a comparator network comprising amplifying semi-conductor devices responsive to said reference voltage and means for adjusting the gain of said network, a power amplifier responsive to operation of said comparator network for controlling said power translating means, said power amplifier comprising a controllable semi-conductor device and semi-conductor means responsive to a predetermined value of countervoltage for protecting said semi-conductor device from the inductive effect of the power translating means, and a current limit network comprising semi-conductor means responsive to the motor armature current for applying a current limit signal voltage to said comparator network for comparison with said reference voltage and including adjustable means for rendering said current limit network operative at a selected value of armature current, the resultant voltage from said comparator network being applied through said power amplifier to control said power translating means.

References Cited in the file of this patent

UNITED STATES PATENTS

| | | |
|---|---|---|
| 2,530,993 | Roman | Nov. 21, 1950 |
| 2,734,160 | Franks et al. | Feb. 7, 1956 |
| 2,754,463 | Hansen et al. | July 10, 1956 |
| 2,847,632 | Harvey et al. | Aug. 12, 1956 |